United States Patent
Nam et al.

(10) Patent No.: US 12,095,026 B2
(45) Date of Patent: Sep. 17, 2024

(54) ALL-SOLID-STATE BATTERY, MANUFACTURING METHOD THEREFOR, SECONDARY BATTERY COMPRISING SAME AND MONOLITHIC BATTERY MODULE COMPRISING SAME

(71) Applicant: RESEARCH INSTITUTE OF INDUSTRIAL SCIENCE & TECHNOLOGY, Pohang-si (KR)

(72) Inventors: Sang Cheol Nam, Seoul (KR); In Sung Lee, Seoul (KR); Eul Noh, Goyang-si (KR)

(73) Assignee: RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 144 days.

(21) Appl. No.: 16/761,308

(22) PCT Filed: Nov. 9, 2018

(86) PCT No.: PCT/KR2018/013638
§ 371 (c)(1),
(2) Date: May 4, 2020

(87) PCT Pub. No.: WO2019/098613
PCT Pub. Date: May 23, 2019

(65) Prior Publication Data
US 2021/0194046 A1    Jun. 24, 2021

(30) Foreign Application Priority Data

Nov. 9, 2017 (KR) .......... 10-2017-0148823

(51) Int. Cl.
*H01M 10/0562* (2010.01)
*H01M 4/131* (2010.01)
(Continued)

(52) U.S. Cl.
CPC ....... *H01M 10/0562* (2013.01); *H01M 4/131* (2013.01); *H01M 4/1391* (2013.01);
(Continued)

(58) Field of Classification Search
None
See application file for complete search history.

(56) References Cited

U.S. PATENT DOCUMENTS

2007/0009771 A1* 1/2007 Leddy ................. H01M 4/50
429/10
2015/0083976 A1* 3/2015 Rao ..................... H01M 4/485
252/507

(Continued)

FOREIGN PATENT DOCUMENTS

EP 3104435 * 6/2016 ............ H01M 4/131
JP 2016-103381 6/2016
(Continued)

OTHER PUBLICATIONS

Ohta et al., "All-solid-state lithium ion battery using garnet-type oxide and Li3BO3 solid electrolytes fabricated by screen printing," J. Power Sources 238 (2013) 53-56 (Year: 2013).*

(Continued)

*Primary Examiner* — Amanda J Barrow
(74) *Attorney, Agent, or Firm* — LEX IP MEISTER, PLLC

(57) ABSTRACT

The present invention relates to an all-solid-state battery including: a battery supporting member including an oxide-based solid electrolyte of a garnet structure; a positive electrode disposed on a first surface of the battery supporting member; and a negative electrode disposed on a second surface of the battery supporting member, wherein the positive electrode includes: a positive active material layer in contact with the first surface of the battery supporting (Continued)

member and including a positive active material represented by a predetermined chemical formula, and an ion conductor; and a positive current collector disposed on the positive active material layer, a manufacturing method thereof, a secondary battery including the same, and a monolithic battery module including the same.

16 Claims, 9 Drawing Sheets

(51) Int. Cl.
    H01M 4/1391    (2010.01)
    H01M 4/38      (2006.01)
    H01M 4/505     (2010.01)
    H01M 4/525     (2010.01)
    H01M 10/0585   (2010.01)
    H01M 4/02      (2006.01)

(52) U.S. Cl.
    CPC .......... *H01M 4/382* (2013.01); *H01M 4/505* (2013.01); *H01M 4/525* (2013.01); *H01M 10/0585* (2013.01); *H01M 2004/021* (2013.01); *H01M 2004/027* (2013.01); *H01M 2004/028* (2013.01); *H01M 2300/0071* (2013.01)

(56)  References Cited

U.S. PATENT DOCUMENTS

| | | | | |
|---|---|---|---|---|
| 2015/0086840 | A1* | 3/2015 | Takami | H01M 4/505 429/223 |
| 2016/0218349 | A1* | 7/2016 | Hasegawa | H01M 4/623 |
| 2016/0380304 | A1* | 12/2016 | Kim | H01M 10/0562 429/189 |
| 2017/0005367 | A1* | 1/2017 | Van Berkel | H01G 11/56 |
| 2017/0179521 | A1* | 6/2017 | Sakamoto | H01M 4/0404 |
| 2017/0229704 | A1* | 8/2017 | Takahashi | H01M 10/0585 |
| 2017/0250446 | A1* | 8/2017 | Kim | H01M 50/46 |
| 2017/0263981 | A1* | 9/2017 | Satou | H01M 4/666 |
| 2017/0288211 | A1* | 10/2017 | Zhamu | H01M 4/62 |
| 2018/0277890 | A1* | 9/2018 | Ueda | H01M 4/525 |
| 2020/0280093 | A1* | 9/2020 | Sakamoto | H01M 4/505 |

FOREIGN PATENT DOCUMENTS

| | | |
|---|---|---|
| KR | 10-2012-0064609 | 6/2012 |
| KR | 10-2015-0047181 | 5/2015 |
| KR | 10-2015-0129953 | 11/2015 |
| KR | 10-2016-0034516 | 3/2016 |
| KR | 10-2017-0037377 | 4/2017 |
| KR | 10-2017-0050138 | 5/2017 |
| KR | 10-2017-0065982 | 6/2017 |
| KR | 10-2017-0098147 | 8/2017 |
| WO | 2016-129427 | 8/2016 |

OTHER PUBLICATIONS

Shingo Ohta et al., "Co-sinterable lithium garnet-type oxide electrolyte with cathode for all-solid-state lithium ion battery", Journal of Power Sources 265 (2014) 40-44.

* cited by examiner

ALL-SOLID-STATE BATTERY, MANUFACTURING METHOD THEREFOR, SECONDARY BATTERY COMPRISING SAME AND MONOLITHIC BATTERY MODULE COMPRISING SAME

CROSS-REFERENCE TO RELATED APPLICATION

This application claims priority to and the benefit of Korean Patent Application No. 10-2017-0148823 filed in the Korean Intellectual Property Office on Nov. 9, 2017, the entire contents of which are incorporated herein by reference.

BACKGROUND OF THE INVENTION

(a) Field of the Invention

The present invention relates to an all-solid-state battery that may be usefully applied as a driving element of a radioactive isotope battery, a manufacturing method thereof, a secondary battery comprising the same, and a monolithic battery module including the same.

(b) Description of the Related Art

A beta battery is an energy conversion element that converts electrical energy from β-rays emitted by radioactive isotopes. The beta battery may be used as a power source for sensors for environmental monitoring in environments where it is difficult for humans to reach, such as polar or remote areas, or as a sensor power source for monitoring pollution or vibration in bridges, tunnels, and nuclear reactors.

The radioactive isotope that may be used for the beta battery may include Ni-63, Pm-147, and H-3, which have a half-life of over 100 years and average energy of 16.7 keV, and Ni-63, in which it is relatively easy to manufacture beta-ray absorbers using Si, and is attracting attention as an isotope that is likely to be used in this beta battery.

However, in the case of the beta battery using Ni-63 as the radioactive isotope, the output current is several nA, the output voltage is several tens of mV, and the output power is as low as 1 nW/cm² or less.

Therefore, in order to actually apply such a beta battery, it is necessary to increase the voltage and current by coupling beta batteries in series and in parallel. In addition, when stacking a beta battery of a monolithic structure on a substrate with a real driving element, it is necessary to store generated power in a secondary battery in a normal manner. However, since the beta battery continuously emits β-rays, a secondary battery capable of withstanding such radiation exposure is essential as the driving element.

In this regard, generally-used secondary batteries contain organic electrolytes or polymer materials, and as described above, there is a problem that the power converted from the beta battery cannot be effectively stored.

Therefore, it is urgently important to develop a battery having excellent capacity and radiation resistance.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present exemplary embodiment is intended to provide an all-solid-state battery and a manufacturing method thereof that may significantly improve capacity while a radiation resistance characteristic is excellent, and may also simplify a production process and reduce a cost.

In addition, the present exemplary embodiment is to provide a secondary battery including an all-solid-state battery, which may be connected to a device requiring high voltage, or may easily implement a monolithic structure with a radioactive isotope battery.

An all-solid-state battery according to an exemplary embodiment of the present invention may include: a battery supporting member including an oxide-based solid electrolyte of a garnet structure; a positive electrode disposed on a first surface of the battery supporting member; and a negative electrode disposed on a second surface of the battery supporting member, wherein the positive electrode includes a positive active material layer in contact with the first surface of the battery supporting member and including a positive active material represented by Chemical Formula 1 and an ion conductor, and a positive current collector disposed on the positive active material layer.

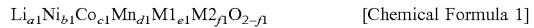

$$Li_{a1}Ni_{b1}Co_{c1}Mn_{d1}M1_{e1}M2_{f1}O_{2-f1}$$ [Chemical Formula 1]

In Chemical Formula 1, $0.97 \leq a1 \leq 1.07$, $0.75 \leq b \leq 0.95$, $0.03 \leq c \leq 0.13$, $0.001 \leq d \leq 0.12$, $0 \leq e \leq 0.05$, $0 \leq f \leq 0.01$, $b1+c1+d1+e1+f1=1$, M1 is one selected from Na, Mg, Al, Si, K, Ca, Sc, Ti, V, B, Cr, Cu, Zn, Ga, Ge, Rb, Sr, Y, Zr, Nb, Mo, Tc, Ru, Rh, Pd, Ag, Cd, In, Sn, Ba, W, and combinations thereof, and M2 is one selected from N, F, P, S, Cl, Br, I, and combinations thereof.

in Chemical Formula 1, b1 may be in a $0.8 \leq b \leq 0.95$ range.

An average particle size of the positive active material may be 1 μm to 10 μm.

The positive active material may be present in a 55 volume % to 80 volume % range with reference to the positive active material layer.

An oxide-based solid electrolyte of the garnet structure may be represented by Chemical Formula 2 below.

$$Li_{(7-a2-x)}M3_xLa_3Zr_{2-y-w}Ta_yM4_zM5wO_{12}$$ [Chemical Formula 2]

In Chemical Formula 2, M3 is selected from a group including Al, Na, K, Rb, Cs, Fr, Mg, Ca, and combinations thereof, M4 is B, M5 is selected from a group including Nb, Sb, Sn, Hf, Bi, W, Se, Ga, Ge, and combinations thereof, $0 \leq a2 \leq 0.1$, $13 \leq x \leq 0.5$, $0.005 \leq y \leq 0.5$, $0.1 \leq z \leq 0.5$, and $0 \leq w < 0.15$.

The ion conductor may include an inorganic-based compound of one or more selected from a group including trilithium borate ($Li_3BO_3$), lithium tetraborate ($Li_2B_4O_7$), lithium borosilicate ($LiBSiO_4$), lithium aluminosilicate ($LiAlSiO_4$), lithium titanium phosphate ($LiTi_2(PO_4)_3$), lithium borosilicon phosphate ($Li_2O$—$SiO_2$—$B_2O_3$—$P_2O_5$), lithium aluminum titanium phosphate ($Li_{1.3}Al_{0.3}Ti_{1.7}(PO_4)_3$), lithium aluminum germanium phosphate ($Li_{1.5}Al_{0.5}Ge_{1.5}(PO_4)_3$) and a sulfide-based ion solid ($Li_2S$—$P_2S_5$).

The ion conductor may be included in a 5 volume % to 15 volume % range with reference to the positive active material layer.

The positive active material layer may further include a conductive material.

The conductive material may include one or more conductive materials selected from a group including cobalt oxide ($Co_3O_4$), cerium oxide ($CeO_2$), indium tin oxide (ITO), indium zinc oxide (IZO), lanthanum cobalt oxide ($LaCoO_3$), copper manganese oxide ($Cu_2MnO_4$), and silver (Ag).

The conductive material may be included in a 10 volume % to 35 volume % range with reference to the positive active material layer.

The positive current collector may include one material selected from stainless steel (SUS, steel use stainless), gold (Au), platinum (Pt), nickel (Ni), aluminum (Al), molybdenum (Mo), carbon (C), silver (Ag), indium (In), and tin (Sn), or two or more thereof.

The thickness of the battery supporting member may be in a 60 μm to 1000 μm range.

The negative electrode may include a lithium metal, an alloy of the lithium metal, lithium titanate ($Li_4Ti_5O_{12}$), or a combination thereof.

A manufacturing method of an all-solid-state battery according to an exemplary embodiment of the present invention may include: forming a positive active material layer by coating a positive active material slurry on a first surface of an electrode supporting member including an oxide-based solid electrolyte of a garnet structure; forming a positive current collector on the positive active material layer; and forming a negative electrode on a second surface of the electrode supporting member, wherein the positive active material slurry includes a positive active material and an ion conductor represented by Chemical Formula 1 below.

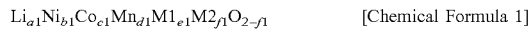
[Chemical Formula 1]

In Chemical Formula 1, 0.97≤a≤1.07, 0.75≤b≤0.95, 0.03≤c≤0.13, 0.001≤d≤0.12, 0≤e≤0.05, 0≤f≤0.01, b1+c1+d1+e1+f1=1, M1 is one selected from Na, Mg, Al, Si, K, Ca, Sc, Ti, V, B, Cr, Cu, Zn, Ga, Ge, Rb, Sr, Y, Zr, Nb, Mo, Tc, Ru, Rh, Pd, Ag, Cd, In, Sn, Ba, W, and combinations thereof, and M2 is one selected from N, F, P, S, Cl, Br, I, and combinations thereof.

The forming of the positive active material layer by coating the positive active material slurry on the first surface of the electrode supporting member may be performed by a printing method for 1 second to 30 seconds.

The printing method may be performed by using at least one printing method among a doctor blading, offset printing, gravure printing, silk screening, and spraying.

The oxide-based solid electrolyte of the garnet structure may be represented by Chemical Formula 2 below, and the all-solid-state battery may be manufactured by including molding the oxide-based solid electrolyte of the garnet structure into a battery supporting member having a thickness of 60 μm to 1000 μm.

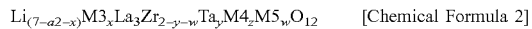
[Chemical Formula 2]

In Chemical Formula 2, M3 is selected from a group including Al, Na, K, Rb, Cs, Fr, Mg, Ca, and combinations thereof, M4 is B, M5 is selected from a group including Nb, Sb, Sn, Hf, Bi, W, Se, Ga, Ge, and combinations thereof, 0≤a2≤0.1, 0≤x≤0.5, 0.005≤y≤0.5, 0.1≤z≤0.5, and 0≤w<0.15.

The positive active material slurry may further include a conductive material, and the conductive material may include one or more selected from a group including cobalt oxide ($Co_3O_4$), cerium oxide ($CeO_2$), indium tin oxide (ITO), indium zinc oxide (IZO), lanthanum cobalt oxide ($LaCoO_3$), copper manganese oxide ($Cu_2MnO_4$), and silver (Ag).

The forming of the negative electrode on the second surface of the battery supporting member may be performed by one of a method of forming the negative electrode of a thin film by vacuum-thermally depositing a negative electrode active material of a lithium metal, an alloy of a lithium metal, lithium titanate ($Li_4Ti_5O_{12}$), or a combination thereof on the second surface of the battery supporting member, or a method of punching a foil made of the negative electrode active material and applying heat to the second surface of the battery supporting member to attach the punched foil.

A secondary battery according to an exemplary embodiment of the present invention includes: a unit cell composed of an all-solid-state battery configured according to an exemplary embodiment; a first exterior material including an opening at one surface and receiving the unit cell; and a second exterior material sealing the opening of the first exterior material.

In the secondary battery according to another exemplary embodiment of the present invention, the plurality of unit cells may be stacked in one direction to be electrically connected.

The first exterior material may include at least one material among ceramic, glass, and a metal including an insulation layer at a surface.

The second exterior material may include at least one metal material of Kovar, Invar, stainless steel, copper, and nickel.

Also, the secondary battery may include a supporting member of a metallic material disposed at the opening edge of the first exterior material, and the supporting member and the second exterior material may be sealed by laser welding.

A monolithic battery module according to an exemplary embodiment of the present invention may include a secondary battery according to exemplary embodiments, and a radioactive isotope battery electrically connected to the secondary battery.

A monolithic battery module according to an exemplary embodiment of the present invention includes: a secondary battery according to exemplary embodiments; a radioactive isotope battery electrically connected to the secondary battery; an energy harvesting element electrically connected to the secondary battery; and a sensor electrically connected to the secondary battery.

The radioactive isotope battery may be at least one among batteries using Ni-63, Pm-147, H-3, Sr-90, Pu-238, and Co-60.

The unit cell and the radioactive isotope battery may be connected via a controller, and the controller may be capable of being low-speed chargeable.

According to exemplary embodiments, it is possible to provide the all-solid-state battery and a manufacturing method thereof which significantly improve capacity of the battery as compared to the prior art, simultaneously simplify the process, and significantly reduce the production cost.

In addition, according to exemplary embodiments, it is possible to easily implement the secondary battery for connecting to a device that requires a high voltage if necessary.

Further, it is possible to provide the secondary battery including the all-solid-state battery that may effectively implement a monolithic structure with a radioactive isotope battery.

DETAILED DESCRIPTION OF THE EMBODIMENTS

Figure 1:
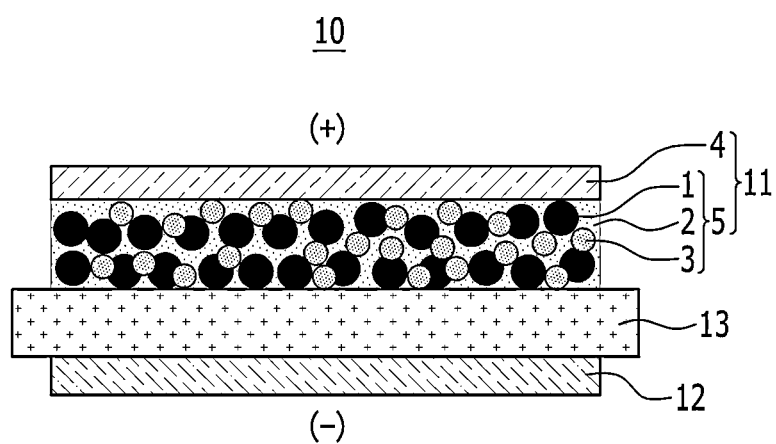
FIG. 1 is a view schematically showing an all-solid-state battery according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly explain the present invention, a portion that is not directly related to the present invention was omitted, and the same reference numerals are attached to the same or similar constituent elements through the entire specification.

In addition, the size and thickness of each configuration shown in the drawings are arbitrarily shown for better understanding and ease of description, but the present invention is not limited thereto.

In addition, unless explicitly described to the contrary, the word "comprise", and variations such as "comprises" or "comprising" will be understood to imply the inclusion of stated elements but not the exclusion of any other elements.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, an all-solid-state battery according to an exemplary embodiment is described in detail with reference to accompanying drawings.

FIG. 1 is a view schematically showing an all-solid-state battery according to an exemplary embodiment of the present invention.

Referring to FIG. 1, in an all-solid-state battery 10 according to an exemplary embodiment, a positive electrode 11 is disposed at a first surface of a battery supporting member 13, and a negative electrode 12 is disposed at a second surface that is opposite to the first surface.

The positive electrode 11 includes a positive active material layer 5 disposed to be in contact with the first surface of the battery supporting member 13, and a positive current collector 4 disposed on the positive active material layer 5.

The positive active material layer 5 may include a positive active material 1 represented by Chemical Formula 1, and an ion conductor 2.

$$Li_{a1}Ni_{b1}Co_{c1}Mn_{d1}M1_{e1}M2_{f1}O_{2-f1}$$ [Chemical Formula 1]

In Chemical Formula 1, $0.97 \leq a \leq 1.07$, $0.75 \leq b \leq 0.95$, $0.03 \leq c \leq 0.13$, $0.001 \leq d \leq 0.12$, $0 \leq e \leq 0.05$, $0 \leq f \leq 0.01$, $b1+c1+d1+e1+f1=1$, M1 is one selected from Na, Mg, Al, Si, K, Ca, Sc, Ti, V, B, Cr, Cu, Zn, Ga, Ge, Rb, Sr, Y, Zr, Nb, Mo, Tc, Ru, Rh, Pd, Ag, Cd, In, Sn, Ba, W, and combinations thereof, and M2 is one selected from N, F, P, S, Cl, Br, I, and combinations thereof.

The positive active material 1 may be used in the all-solid-state battery for radiation resistance.

In Chemical Formula 1, b1 is more preferably in a range of $0.8 \leq b1 \leq 0.95$ or $0.85 \leq b1 \leq 0.95$ in terms being capable of realizing a high-capacity all-solid-state battery.

The average particle size of the positive active material 1 may be in the range of 1 μm to 10 μm, more specifically 1 μm to 5 μm. When the average particle size of the positive active material 1 satisfies the above-described range, there is a merit that a uniform positive active material slurry may be produced.

In addition, the positive active material 1 may be included in a range of 55 volume % to 80 volume %, more specifically, 60 volume % to 75 volume %, with reference to the positive active material layer 5. When the volume ratio of the positive active material 1 satisfies the above-described range, a discharge capacity per unit area is excellent, and thus the all-solid-state battery having high capacity may be realized. The all-solid-state battery may be for radiation resistance.

Among currently known materials for the positive active material, $LiCoO_2$ is one of commercially available materials. However, $LiCoO_2$ is limited in the field of application in the case of a secondary battery using it as the positive active material due to its low capacity of about 60 μAh/cm² μm.

Therefore, as a part of securing high capacity of the all-solid-state battery, the inventors attempted to apply a positive active material including Ni, Co, and Mn (hereinafter, an NCM-based composition), and at the same time having an NCM-based composition with a high molar ratio of Ni in the positive active material of the all-solid-state battery.

That is, like in Chemical Formula 1, by applying the positive active material of the NCM-based composition of which the molar ratio of Ni is at least 0.75 or more to the all-solid-state battery, the capacity of the all-solid-state battery according to the exemplary embodiments may be effectively increased.

On the other hand, the ion conductor 2 serves as a medium for moving lithium ions from the battery supporting member containing the solid electrolyte. In general, in the case of the all-solid-state battery, it is known that the interface characteristic between the positive active material and the solid electrolyte is poor and it is very difficult to control it.

However, in the present exemplary embodiment, the interface characteristic between the positive active material layer 5 and the solid electrolyte may be significantly improved by applying the ion conductor 2.

More specifically, when the solid electrolyte constituting the battery supporting member is regarded as a first phase, the ion conductor 2 included in the positive active material layer may be regarded as a solid electrolyte of a second phase capable of transferring lithium ions. The solid electrolyte of the second phase is disposed between the solid electrolyte of the first phase and the positive active material, so that the lithium ions may move smoothly into the positive active material.

The ion conductor 2, for example, may include an inorganic-based compound of one or more kinds selected from a group including trilithium borate ($Li_3BO_3$), lithium tetraborate ($Li_2B_4O_7$), lithium borosilicate ($LiBSiO_4$), lithium aluminosilicate ($LiAlSiO_4$), lithium titanium phosphate ($LiTi_2(PO_4)_3$), lithium borosilicon phosphate ($Li_2O$—$SiO_2$—$B_2O_3$—$P_2O_5$), lithium aluminum titanium phosphate ($Li_{1.3}Al_{0.3}Ti_{1.7}(PO_4)_3$), lithium aluminum germanium phosphate ($Li_{1.5}Al_{0.5}Ge_{1.5}(PO_4)_3$) and a sulfide-based ion solid ($Li_2S$—$P_2S_5$).

The ion conductor 2 may be included in a range of 5 volume % to 15 volume % with reference to the positive active material layer 5. When the volume ratio of the ion conductor 2 satisfies the above-described range, the discharge capacity per unit area is excellent, and thus the all-solid-state battery having high capacity may be realized. The all-solid-state battery may be for radiation resistance.

Meanwhile, the positive active material layer 5 may further include a conductive material 3. The conductive material 3 serves to receive electrons from the positive current collector and supply electrons to the positive active material. By including the conductive material 3 as described above, by smoothly flowing electrons from the positive current collector to the positive active material, the capacity of the battery may be improved.

Specifically, in the case of the lithium ion battery using a liquid electrolyte, it is usual to use a graphite-based conductive material, but in the present exemplary embodiment, since the positive active material layer is formed by heat treatment after the positive active material slurry is coated on the surface of the battery supporting member, it is inappropriate to use the graphite-based conductive material.

The conductive material 3, for example, may include one or more conductive materials selected from a group consisting of cobalt oxide ($Co_3O_4$), cerium oxide ($CeO_2$), indium tin oxide (ITO), indium zinc oxide (IZO), lanthanum cobalt oxide ($LaCoO_3$), copper manganese oxide ($Cu_2MnO_4$), and silver (Ag).

The conductive material 3 may be included in a range of 10 volume % to 35 volume %, and more preferably, 15 volume % to 30 volume %, with reference to the positive active material layer 5. When the volume ratio of the conductive material 3 satisfies the range, the discharge capacity per unit area is excellent, and thus the all-solid-state battery having high capacity can be realized. The all-solid-state battery may be for radiation resistance.

Next, the positive current collector, for example, may include one material or two or more materials selected from stainless steel (SUS, steel use stainless), gold (Au), platinum (Pt), nickel (Ni), aluminum (Al), molybdenum (Mo), carbon (C), Silver (Ag), indium (In), and tin (Sn).

Meanwhile, the battery supporting member may be composed of an oxide-based solid electrolyte of a garnet structure.

The oxide solid electrolyte of the garnet structure may be represented by Chemical Formula 2.

$Li_{(7-a2-x)}M3_xLa_3Zr_{2-y-w}Ta_yM4_zM5_wO_{12}$ [Chemical Formula 2]

In Chemical Formula 2, M3 is selected from a group including Al, Na, K, Rb, Cs, Fr, Mg, Ca, and combinations thereof, M4 is B, M5 is selected from a group including Nb, Sb, Sn, Hf, Bi, W, Se, Ga, Ge, and combinations thereof, and $0 \leq a2 \leq 0.1$, $0 \leq x \leq 0.5$, $0.005 \leq y \leq 0.5$, $0.1 \leq z \leq 0.5$, and $0 \leq w < 0.15$.

The oxide of the garnet structure is suitable for use as the solid electrolyte because a potential window is relatively wide, water reactivity is low, and reactivity with a metal lithium is small.

The oxide solid electrolyte of the garnet structure according to the present exemplary embodiment improves the ion conductivity of the solid electrolyte by doping tantalum (Ta) with respect to a basic composition of the garnet structure ($Li_7La_3Zr_2O_{12}$). Specifically, in the case of tantalum (Ta), there is no reactivity with lithium (Li) when doping in a small amount, but as the content of lithium (Li) is reduced by being substituted at zirconium (Zr) sites in the basic composition of the garnet structure, the content of lithium (Li) may be reduced. Due to this, it is possible to contribute to improving ion conductivity by increasing a vacancy of lithium (Li).

In addition, the solid electrolyte represented by Chemical Formula 1 enables liquid phase sintering by increasing the doping amount of boron (B), such that the sintering characteristic of the garnet structure oxide is improved. In addition, boron is a doping element that makes the structure of an oxide, which is a cubic structure, dense.

Further, in the solid electrolyte represented by Chemical Formula 1, aluminum (Al) may be further doped, and in this case, since one aluminum ion (i.e., $Al^{3+}$) corresponds to three lithium ions ($Li^+$), the vacancy of lithium (Li) increases by the doping of aluminum (Al), and thus the lattice structure of the oxide of the cubic structure becomes more disordered, so that lithium ion conductivity may be increased. In addition, aluminum (Al) is doped on the oxide of the garnet structure, thereby contributing to improving pellet density and reducing pores.

The thickness of the battery supporting member may be 60 μm to 1000 μm, more specifically, in a 100 μm to 500 μm range. When the thickness of the battery supporting member satisfies the above-described range, thinning of the all-solid-state battery is easy.

Meanwhile, in general, the lithium secondary battery uses an organic-based electrolyte solution. However, referring to Experimental Example 1 described later, in the case of the secondary battery using the organic-based electrolyte solution, there is a problem in that the electrochemical characteristics are significantly deteriorated due to degradation of the battery due to decomposition of the organic-based electrolyte solution during irradiation. Therefore, when the lithium secondary battery using the organic-based electrolyte solution is used, power emitted from the radioactive isotope battery cannot be effectively stored. Accordingly, the inventors of the present invention developed a method using the solid electrolyte battery as an alternative.

In this regard, in conventional all-solid-state batteries, $Li_{3.1}PO_{3.3}N_{0.6}$ (commercial name: LIPON, lithium phosphorous oxynitride) is generally used as the solid electrolyte. However, it is not easy to implement in a form of a thin film on the positive electrode thin film, it is difficult to receive a substrate, and there is a problem in that a manufacturing cost increases due to a low deposition speed (<10 nm/min).

However, in the present exemplary embodiment, since the oxide solid electrolyte of the garnet structure represented by Chemical Formula 1 is used, it may be easily formed into a sheet to reduce the thickness, and may be easily applied as the battery supporting member.

On the other hand, the negative electrode is disposed on the second surface of the battery supporting member.

The negative electrode, for example, may include a lithium metal, an alloy of the lithium metal, lithium titanate (lithium titanate, $Li_4Ti_5O_{12}$), or a combination thereof. Here, as the alloy of the lithium metal, thane alloy of lithium and a metal of Na, K, Rb, Cs, Fr, Be, Mg, Ca, Sr, Si, Sb, Pb, In, Zn, Ba, Ra, Ge, Al, or Sn may be used.

Next, a manufacturing method of the all-solid-state battery according to an exemplary embodiment of the present invention is described.

The manufacturing method of the all-solid-state battery according to an exemplary embodiment includes a step of coating a positive active material slurry on a first surface of an electrode supporting member including an oxide-based solid electrolyte of a garnet structure to form a positive active material layer, a step of forming a positive current collector on the positive active material layer, and a step of forming a negative electrode on a second surface of the electrode supporting member.

The all-solid-state battery may be for radiation resistance.

In the present exemplary embodiment, the process of manufacturing the positive active material slurry for forming the positive active material layer may be performed by any method as long as each material in the slurry may be uniformly mixed. Specifically, it may be performed using, for example, three-roll milling.

Also, the step of forming the positive active material layer by coating the positive active material slurry on the first surface of the electrode supporting member may be performed by a printing method for 1 second to 30 seconds. That is, since the positive active material layer is formed using the printing method, the manufacturing time may be significantly shortened when compared with a conventional sputtering process.

The printing method may be performed using, for example, at least one printing method among doctor blading, offset printing, gravure printing, silk screening, and spraying.

The conventional all-solid-state battery forms the positive active material layer by using a sputtering process. However, when the sputtering process is performed using the positive active material of the NCM-based composition having a high N molar ratio like the present invention, it is difficult to uniformly distribute the NCM composition within the positive active material layer, so the characteristics of the battery are very deteriorated.

However, in the present exemplary embodiment, since the positive active material layer is formed by using the printing method, the manufacturing time may be significantly shortened and simultaneously highly-capacity all-solid-state batteries may be easily manufactured by using the positive active material of the NCM-based composition with a high Ni molar ratio.

On the other hand, the step of forming the negative electrode on the other surface of the battery supporting member may be performed by one of a method of forming the negative electrode of the thin film form by vacuum-thermally depositing the negative electrode of the lithium metal, the alloy of the lithium metal, or the combination thereof on the second surface of the battery supporting member, or a method of punching a foil made of the negative electrode active material and adhering the punched foil by applying heat to the second surface of the battery supporting member.

On the other hand, the positive active material slurry includes the positive active material represented by Chemical Formula 1 and the ion conductor.

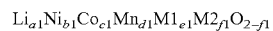  [Chemical Formula 1]

In Chemical Formula 1, $0.97 \leq a1 \leq 0.75 \leq b \leq 0.95$, $0.03 \leq c \leq 0.13$, $0.001 \leq d1 \leq 0.12$, $0 \leq e1 \leq 0.05$, $0 \leq f1 \leq 0.01$, b1+c1+d1+e1+f1=1, M1 is one selected from Na, Mg, Al, Si, K, Ca, Sc, Ti, V, B, Cr, Cu, Zn, Ga, Ge, Rb, Sr, Y, Zr, Nb, Mo, Tc, Ru, Rh, Pd, Ag, Cd, In, Sn, Ba, W, and combinations thereof, and M2 is one selected from N, F, P, S, Cl, Br, I, and combinations thereof.

The ion conductor to perform a function of transferring the lithium ions, for example, may include an inorganic-based compound of one kind or more selected from a group including trilithium borate ($Li_3BO_3$), lithium tetraborate ($Li_2B_4O_7$), lithium borosilicate ($LiBSiO_4$), lithium aluminosilicate ($LiAlSiO_4$), lithium titanium phosphate ($LiTi_2(PO_4)_3$), lithium borosilicon phosphate ($Li_2O$—$SiO_2$—$B_2O_3$—$P_2O_5$), lithium aluminum titanium phosphate ($Li_{0.3}Al_{0.3}Ti_{1.7}(PO_4)_3$), lithium aluminum germanium phosphate ($Li_{1.5}Al_{0.5}Ge_{1.5}(PO_4)_3$), and a sulfide-based ion solid ($Li_2S$—$P_2S_5$).

Also, the positive active material slurry further includes the conductive material, and the conductive material may include the conductive material of one kind or more selected from a group including cobalt oxide ($Co_3O_4$), cerium oxide ($CeO_2$), indium tin oxide (ITO), indium zinc oxide (IZO), lanthanum cobalt oxide ($LaCoO_3$), copper manganese oxide ($Cu_2MnO_4$), and silver (Ag).

On the other hand, the oxide-based solid electrolyte of the garnet structure is represented by Chemical Formula 2, and may be manufactured by including a step of molding the oxide-based solid electrolyte of the garnet structure with the battery supporting member in a 60 μm to 1000 μm, in more detail, in a 100 μm to 500 μm range.

  [Chemical Formula 2]

In Chemical Formula 2, M3 is selected from a group including Al, Na, K, Rb, Cs, Fr, Mg, Ca and combinations thereof, M4 is B, M5 is selected from a group including Nb, Sb, Sn, Hf, Bi, W, Se, Ga, Ge, and combinations thereof, and $0 \leq a2 \leq 0.1$, $0 \leq x \leq 0.5$, $0.005 \leq y \leq 0.5$, $0.1 \leq z \leq 0.5$, and $0 \leq w < 0.15$.

To manufacture the oxide-based solid electrolyte powder of the garnet structure represented by Chemical Formula 2, by considering stoichiometry of Chemical Formula 2, may include a process of mixing an appropriate lithium raw material, a lanthanum raw material, a zirconium raw material, a tantalum raw material, and other doping raw materials, ball-milling them, baking them, and then again ball-milling them for particle size control. In this case, according to a doping element, a baking temperature may be less than 1000° C., and the prepared pellet may exhibit lithium ion conductivity of $0.9 \times 10^{-4}$ S/cm or more.

The more detailed description of the positive active material, the ion conductor, the conductive material, and the oxide-based solid electrolyte of the garnet structure is the same as described above and is omitted here.

Next, the secondary battery according to an exemplary embodiment of the present invention is described.

Figure 2:
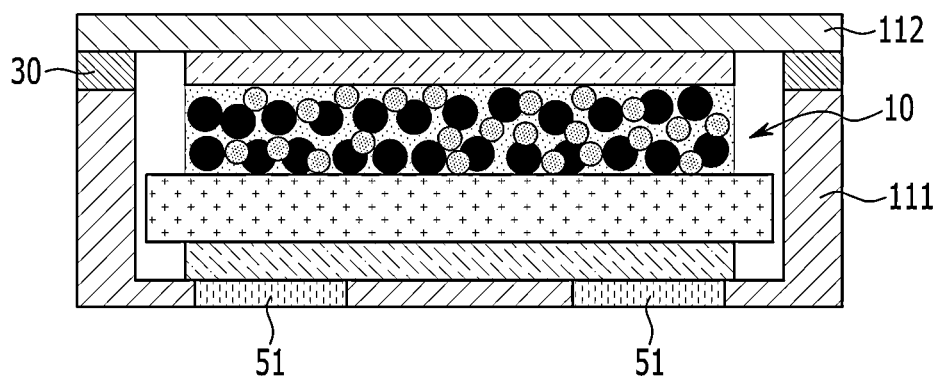
FIG. 2 is a view schematically showing a secondary battery according to an exemplary embodiment.

FIG. 2 is a view schematically showing a secondary battery according to an exemplary embodiment.

Referring to FIG. 2, a secondary battery 100 according to an exemplary embodiment includes a unit cell 10 composed of the all-solid-state battery and a case in which the unit cell 10 is built in.

In this case, the all-solid-state battery is the same as the all-solid-state battery according to an exemplary embodiment of the present invention, and the detailed description is omitted here.

The case includes an opening formed on one surface, and includes a first exterior material 111 receiving the unit cell and a second exterior material 112 sealing the opening of the first exterior material.

The first exterior material 111 includes a receiving unit capable of receiving the unit cell 10.

Also, an electrode 51 is built in the bottom of the unit cell 10 for electrical connection to the outside.

The first exterior material 111 may be made of at least one material among ceramic, glass, and a metal including an insulation layer included on a surface.

The second exterior material 112 may be made of at least one metal material among Kovar, Invar, stainless steel, copper, and nickel.

In this case, the electrode included in the first exterior material 111 and the material of the second exterior material 112 may be exchanged depending on an insertion direction of the unit cell 10.

In detail, when the negative electrode of the unit cell 10 is inserted to be close to the bottom surface of the first exterior material 111, the electrode 51 built in the bottom of the first exterior material 111 may be a negative electrode (−) and the second exterior material 112 may be a material representing a (+) pole.

Also, when the positive electrode of the unit cell 10 is inserted to be close to the bottom surface of the first exterior material 111, the electrode 51 of the first exterior material 111 may be a positive electrode (+) and the second exterior material 112 may be a material representing a (−) pole.

A supporting member 30 of a metallic material may be disposed on the opening edge of the first exterior material 111. The supporting member 30 plays a role sealing the first exterior material 111 and the second exterior material 112. That is, the supporting member 30 and the second exterior material 112 may be sealed by using laser welding.

On the other hand, the secondary battery 100 may further include a soft lithium metal foil between the negative electrode of the unit cell 10 and the bottom surfaces of the first exterior material 111.

As above-described, when the soft lithium metal foil is further included between the negative electrode of the unit cell 10 and the bottom surface of the first exterior material 111, a conductivity characteristic between the first exterior material 111 and second exterior material 112 and the positive electrode and negative electrode of the unit cell 10 may be further improved.

The secondary battery according to the present exemplary embodiment has an excellent sealing characteristic, so device maintenance is possible, and it is very easy to apply it to a monolithic battery module to be described later.

Figure 3:
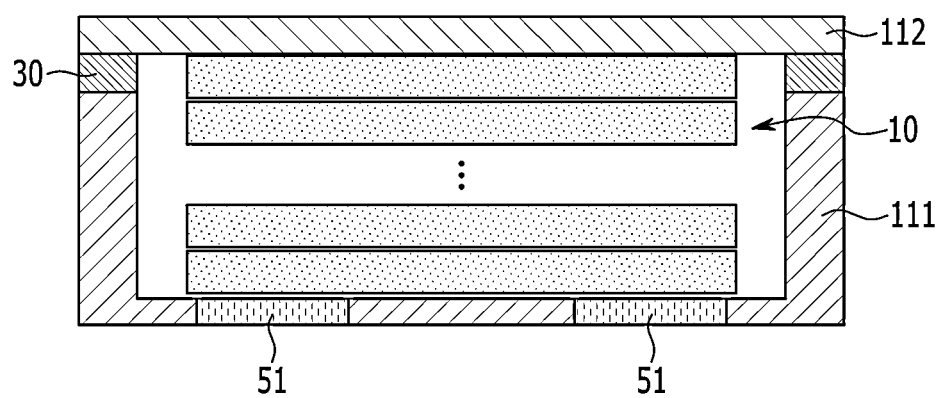
FIG. 3 is a view schematically showing a secondary battery according to another exemplary embodiment.

FIG. 3 is a view schematically showing a secondary battery according to another exemplary embodiment.

Referring to FIG. 3, the secondary battery 200 according to another exemplary embodiment may be a structure in which the plurality of unit cells 10 composed of the all-solid-state battery according to an exemplary embodiment of the present invention are stacked in one direction and electrically connected.

Since the unit cells 10 are coupled in series, it is very advantageous when applying the secondary battery to a high voltage device.

Other features except that the plurality of unit cells 10 are stacked are the same as the secondary battery according to the exemplary embodiment described with reference to FIG. 2, and are omitted here.

Figure 4:
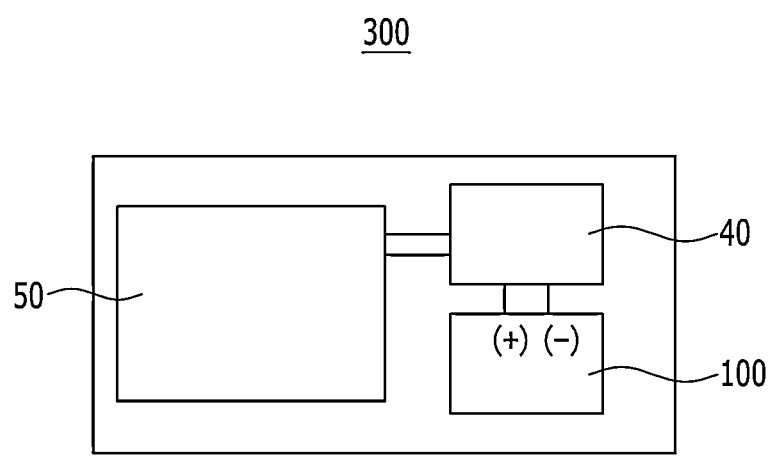
FIG. 4 is a view schematically showing a monolithic battery module according to an exemplary embodiment.

FIG. 4 is a view schematically showing a monolithic battery module according to an exemplary embodiment.

Referring to FIG. 4, a monolithic battery module 300 includes the secondary battery 100 according to an exemplary embodiment, and a radioactive isotope battery 50 electrically connected to the secondary battery 100.

The radioactive isotope battery 50, for example, may be at least one among the batteries using Ni-63, Pm-147, H-3, Sr-90, Pu-238, and Co-60.

Also, the secondary battery 100 and the radioactive isotope battery 50 may be connected via a controller 40. The controller 40 serves to efficiently store the fine current emitted from the radioactive isotope battery 50 to the secondary battery by reducing power consumption as much as possible.

In addition, since the controller 40 is capable of trickle charging, a nA-level fine current generated from the radioactive isotope may be effectively collected.

On the other hand, in the present exemplary embodiment, the secondary battery 200 according to another exemplary embodiment may be applied as the secondary battery included in the battery module 300.

Figure 9:
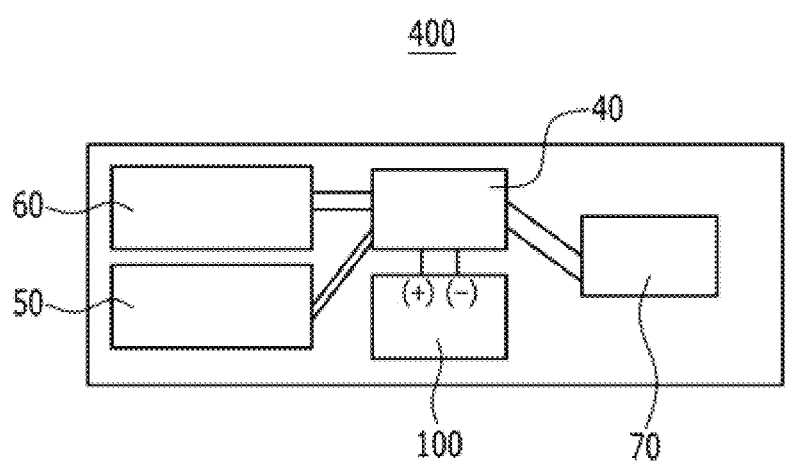
FIG. 9 is a view schematically showing a monolithic battery module according to another exemplary embodiment.

FIG. 9 is a view schematically showing a monolithic battery module according to another exemplary embodiment.

Referring to FIG. 9, the monolithic battery module 400 further includes an energy harvesting element 60 and a sensor 70 as well as the secondary battery 100 according to an exemplary embodiment and the radioactive isotope battery 50 electrically connected to the secondary battery 100.

The radioactive isotope battery 50, for example, may be at least one among the batteries using Ni-63, Pm-147, H-3, Sr-90, Pu-238, and Co-60.

Also, the secondary battery 100 and the radioactive isotope battery 50 may be connected via the controller 40. The controller 40 serves to efficiently store the fine current emitted from the radioactive isotope battery 50 to the secondary battery by reducing power consumption as much as possible.

In addition, since the controller 40 is capable of trickle charging, a nA-level fine current generated from the radioactive isotope may be effectively collected.

Further, the energy harvesting element 60 serves as a power source for charging.

The sensor 70 serves as a load for the battery.

On the other hand, the secondary battery 200 according to another exemplary embodiment may be applied as the secondary battery included in the battery module 400 in the present exemplary embodiment.

Hereinafter, a preferable exemplary embodiment of the present invention and an experimental example according thereto are described. However, an exemplary embodiment below is only an exemplary embodiment of the present invention, and the present invention is not limited to the exemplary embodiment below.

Exemplary Embodiment 1—High-Capacity all-Solid-State Battery Unit Cell Manufacturing (1) Manufacturing a Battery Supporting Member Made of a Solid Electrolyte First, a solid electrolyte of a $Li_{6.98}La_3Zr_{1.65}Ta_{0.35}B_{0.3}Al_{0.2}O_{12}$ composition is manufactured.

As a raw material, $LiOH \cdot H_2O$ (Alfa Aesar, 99.995%), $La_2O_3$ (Kanto, 99.99%), $ZrO_2$ (Kanto, 99%), $Ta_2O_5$ (Aldrich, 99%), $H_3BO_3$ (Aldrich, 99.9%) and $\gamma$-$Al_2O_3$ (Aldrich, 99%) are respectively prepared.

In this case, the $La_2O_3$ powder is dried at 900° C. for 24 h to remove all adsorbed moisture, and the $LiOH \cdot H_2O$ powder is dried at 200° C. for 6 h to remove the moisture adsorbed to the surface.

Next, a $La_2O_3$ powder, a $ZrO_2$ powder, a $Ta_2O_5$ powder, a $H_3BO_3$ powder, and a $\gamma$-$Al_2O_3$ powder are weighed to be matched to a molar ratio of the targeted $Li_{6.98}La_3Zr_{1.65}Ta_{0.35}B_{0.3}Al_{0.2}O_{12}$.

Also, in the case of the $LiOH \cdot H_2O$ powder as the lithium raw material, by considering that lithium is volatilized during pellet sintering later, it is prepared in an excess amount of about 5 mol % compared to the targeted composition. In this case, a liquid phase sintering effect may be expected.

Next, along with the dried $La_2O_3$ and $LiOH \cdot H_2O$ powders, the $ZrO_2$ powder, the $Ta_2O_5$ powder, the $H_3BO_3$ powder, and the $\gamma$-$Al_2O_3$ powder are mixed and inserted in a Nalgene bottle along with balls in which Zirconia of diameters of 3 mm and 5 mm are mixed at a ratio of 1:1, and then Isopropyl alcohol is added and ball-milling is performed at 25° C. for 24 h. In this case, to improve the mixture performance, a small amount of ammonia water at a concentration of 28% (about 1 wt % relative to the entire weight of the mixed powder) is added as a dispersant.

The ball-milled powder is dried in a drying furnace at 200° C. for 24 h, and then baked in a sintering furnace at 900° C. for 7 h, and a heating rate at this time is 2° C./min. By ball-milling the baked powder at 25° C. for 12 h, a uniform solid electrolyte powder with an average particle size of 2 μm or less may be obtained.

In detail, the obtained solid electrolyte powder is an oxide powder of the garnet structure satisfying the composition of $Li_{6.98}La_3Zr_{1.65}Ta_{0.35}B_{0.3}Al_{0.2}O_{12}$. After drying it, it is formed into a pellet by applying a pressure of 2 ton/cm² with a forming mold and then sintered for 14 h in an oxygen atmosphere. In this case, the heating rate during the sintering is 2° C./min, and the final sintering temperature is controlled to 950° C.

The pellet thus manufactured exhibits lithium ion conductivity of $3.53 \times 10^{-4}$ S/cm, and characteristics of a pellet density of 4.6 g/cm³ and activation energy of 4.2 eV are exhibited.

The solid electrolyte pellet thus prepared should be reduced in thickness to be used as a battery supporting member and polished by a dry method to obtain a final thickness of about 400 μm.

(2) Manufacturing an Ion Conductor

A trilithium borate compound ($Li_3BO_3$) is used as a room temperature ion conductor of a solid state to mediate lithium ion movement between the positive active material powder and the powder.

In detail, $LiOH \cdot H_2O$ (Alfa Aesar, 99.9%) and $H_3BO_3$ (Aldrich, 99.9%) as the raw material are weighed and prepared to be suitable for the molar ratio of the targeted composition.

After uniformly mixing each prepared raw material, the mixture is inserted in a furnace and heat-treated at 600° C. for 12 h.

The heat-treated compound is classified after going through a crushing process to obtain the powder having the average particle size of 1 μm.

The powder is sensitive to moisture, so it is stored in a dry room with a dew point of below −50° C. after manufacturing.

(3) Manufacturing a Positive Active Material

A precursor having a $(Ni_{0.88}Co_{0.095}Mn_{0.025})(OH)_2$ composition is prepared to have an average diameter D50 of 3-4 μm according to a typical co-precipitation method.

The precursor and a $LiOH \cdot H_2O$ (Samjeon Chemical, battery grade) lithium salt are uniformly mixed to have a molar ratio of 1:1.05.

The mixture is inserted into a circular tube furnace having an interior diameter of 50 mm and a length of 1000 mm and is baked while inflowing oxygen at 200 mL/min.

During the baking, it is maintained at 480° C. for 5 h and then maintained at 700 to 750° C. for 16 h, and the heating rate is 5° C./min. Accordingly, the positive active material having the $Li_{1.05}Ni_{0.88}Co_{0.095}Mn_{0.025}O_2$ composition is obtained.

(4) Manufacturing a Positive Active Material Slurry $Li_{1.05}Ni_{0.88}Co_{0.035}Mn_{0.025}O_2$ prepared in (3) is used as the positive active material, and $Co_3O$ of one kind of the oxide-based conductive material is used for smooth electronic conduction from the positive current collector between the positive active material powder and the powder.

In this case, the conductive material was prepared with $Co_3O_4$ (Aldrich, 99.5%) as a nanopowder of 50 nm or less.

The positive active material and the conductive material are uniformly mixed, and then the trilithium borate is added as the ion conductor. Here, a volume ratio of $Li_{0.05}Ni_{0.88}Co_{0.035}Mn_{0.025}O_2:Co_3O_4$:lithium borate is set as 73:19:8.

In order to ensure that the conductive material and ion conductor are uniformly distributed in the positive electrode slurry, a slurry is prepared by a three-roll milling method, and this is repeated three times. In this case, 1 g of ethyl cellulose is added as a binder and terpineol is used as a solvent.

(5) Manufacturing an all-Solid-State Battery

The battery supporting member prepared in (1) is cut into a circular shape having a diameter of 6 mm (area of 0.28 cm²), and the positive active material slurry prepared in (4) is uniformly coated on the first surface of the battery supporting member by using a polyethylene pattern mask and then is dried at 100° C. for 2 h to remove all solvent.

Next, it is inserted into a heating furnace for first heat treatment at 450° C. for 4 h and then secondarily heat-treated at 600° C. for 2 h to remove all organic material binder included in the slurry, thereby forming the positive active material layer on the first surface of the battery supporting member.

A positive current collector having a diameter of 8 mm is deposited to cover the entire area of the positive active material layer formed as described above. Specifically, gold (Au) is deposited by a vacuum thermal deposition method and deposited to a thickness of 300 nm.

Next, a lithium (Li) metal having a thickness of 3 μm and a diameter of 8 mm is deposited on the second surface of the battery supporting member by a vacuum thermal deposition method to manufacture the all-solid-state battery.

The all-solid-state battery thus manufactured is a structure in which the positive and negative electrodes are respectively disposed on sides of the battery supporting member made of the solid electrolyte, and the battery supporting member separates the positive electrode and the negative electrode from each other.

(6) Manufacturing a Secondary Battery Including an all-Solid-State Battery

The unit cell made of the all-solid-state battery manufactured as described in (5) is housed inside the first exterior material made of a ceramic and including an opening on one side and a metal terminal on the bottom surface. At this time, the unit cell is disposed so that the negative electrode faces the bottom and the positive electrode faces the opening.

Next, a lithium metal foil of a 200 μm thickness is cut to fit the bottom area of the first exterior material and then disposed on the bottom surface.

The opening of the first exterior material is sealed using the second exterior material made of the metal. Specifically, after disposing the supporting member of the metallic material on the opening edge of the first exterior material, the supporting member and the second exterior material are contacted and then laser welding is performed.

At this time, the unit cell is attached to the second exterior material by using a conductive gold (Au) paste, thereby manufacturing the secondary battery having the same structure as in FIG. 2.

Exemplary Embodiment 2

The secondary battery is manufactured by the same method as (1) to (6) of Exemplary Embodiment 1, except that the volume ratio of $Li_{1.05}Ni_{0.88}Co_{0.095}Mn_{0.025}O_2$:$Co_3O_4$:trilithium borate is 63:29:8 during the manufacturing of the positive active material slurry in (4).

Exemplary Embodiment 3

After the all-solid-state battery manufactured by the same method as (1) to (5) in Exemplary Embodiment 1 is charged to 4.2 V and then two all-solid-state batteries are stacked in series, the secondary battery is manufactured by the same method as (6) of Exemplary Embodiment 1.

Exemplary Embodiment 4

After the all-solid-state battery manufactured by the same method as (1) to (5) in Exemplary Embodiment 1 is charged to 4.2 V and then three all-solid-state batteries are stacked in series, the secondary battery is manufactured by the same method as (6) of Exemplary Embodiment 1.

Exemplary Embodiment 5

After the all-solid-state battery manufactured by the same method as (1) to (5) in Exemplary Embodiment 1 is charged to 4.2 V and then two all-solid-state batteries are stacked in parallel, the secondary battery is manufactured by the same method as (6) of Exemplary Embodiment 1.

Exemplary Embodiment 6

After the all-solid-state battery manufactured by the same method as (1) to (5) in Exemplary Embodiment 1 is charged to 4.2 V and then three all-solid-state batteries are stacked in parallel, the secondary battery is manufactured by the same method as (6) of Exemplary Embodiment 1.

Exemplary Embodiment 7

After the all-solid-state battery manufactured by the same method as (1) to (5) in Exemplary Embodiment 1 is charged to 4.2 V and then five all-solid-state batteries are stacked in parallel, the secondary battery is manufactured by the same method as (6) of Exemplary Embodiment 1.

Exemplary Embodiment 8

After the all-solid-state battery manufactured by the same method as (1) to (5) in Exemplary Embodiment 1 is charged to 4.2 V and then seven all-solid-state batteries are stacked in parallel, the secondary battery is manufactured by the same method as (6) of Exemplary Embodiment 1.

Comparative Example 1

The secondary battery is manufactured by the same method as (1) to (6) of Exemplary Embodiment 1, except that $LiCoO_2$ having an average diameter D50 of 5 μm is used as the positive active material.

Reference Example 1

The secondary battery is manufactured by the same method as (1) to (6) of Exemplary Embodiment 1, except that the volume ratio of $Li_{1.05}Ni_{0.88}Co_{0.095}Mn_{0.025}O_2$:$Co_3O_4$:trilithium borate is 83:9:8 during the manufacturing of the positive active material slurry in (4).

Reference Example 2

The secondary battery is manufactured by the same method as (1) to (6) of Exemplary Embodiment 1, except that the volume ratio of $Li_{1.05}Ni_{0.88}Co_{0.095}Mn_{0.025}O_2$:$Co_3O_4$:trilithium borate is 90:2:8 during the manufacturing of the positive active material slurry in (4).

Reference Example 3

The secondary battery is manufactured by the same method as (1) to (6) of Exemplary Embodiment 1, except that the volume ratio of $Li_{1.05}Ni_{0.88}Co_{0.095}Mn_{0.025}O_2$:$Co_3O_4$:trilithium borate is 54:38:8 during the manufacturing of the positive active material slurry in (4).

Reference Example 4

The secondary battery is manufactured by the same method as (1) to (6) of Exemplary Embodiment 1, except that the volume ratio of $Li_{10.5}Ni_{0.88}Co_{0.095}Mn_{0.025}O_2$:$Co_3O_4$:trilithium borate is 45:47:8 during the manufacturing of the positive active material slurry in (4).

Experimental Example 1

(1) Manufacturing a Secondary Battery Using an Organic-Based Electrolyte Solution $Li_{1.05}Ni_{0.88}Co_{0.095}Mn_{0.025}O_2$ at 92.5 wt % as the positive active material, Denka black 3.5 at wt % as a conductive material, and polyvinylidene fluoride (PVDF, KF1100) at 4 wt % as a binder are mixed in an NMP (N-methyl-2-pyrrolidone) solvent to have a solid content of about 30%, thereby manufacturing a positive active material slurry.

The positive active material slurry is coated on an aluminum foil (Al foil) by using a doctor blade to a thickness of 15 μm and dried, and the positive electrode is manufactured through rolling.

At this time, an electrode loading amount is 14.6 mg/cm$^2$, and a rolling density is 3.1 g/cm$^3$.

A lithium metal (Li-metal, Honjo Metal) with a thickness of 200 μm is used as the positive electrode and a facing electrode prepared as described above, and a solution in which 1 mol of a $LiPF_6$ solution is dissolved in a mixed solvent of which the volume ratio of ethylene carbonate (EC):dimethyl carbonate (DMC):ethyl methyl carbonate (EMC) is 3:4:3, is used as the electrolyte solution.

By using each constituent element, two sets of secondary batteries of a coin cell (CR2032) type are manufactured according to a conventional manufacturing method.

(2) Progress of a Charge and Discharge Test

A charging and discharge test is performed by using the secondary battery prepared according to (1).

For capacity evaluation, 212 mAh/g is used as a reference capacity, and CC/CV 2.5-4.25 V, 1/20 C cut-off are applied for the charge and discharge conditions. An initial capacity is calculated from a result of performing 0.2 C charge/0.2 C discharge after 0.1 C charge/0.1 C discharge.

One set of the secondary batteries manufactured according to the (1) is used for irradiation, and the other set is used for a comparison. At this time, in the irradiation condition, β-rays of 6 MeV as high energy radiation are irradiated at 0.5 Hz by 15 pulses for 30 seconds.

Figure 5:
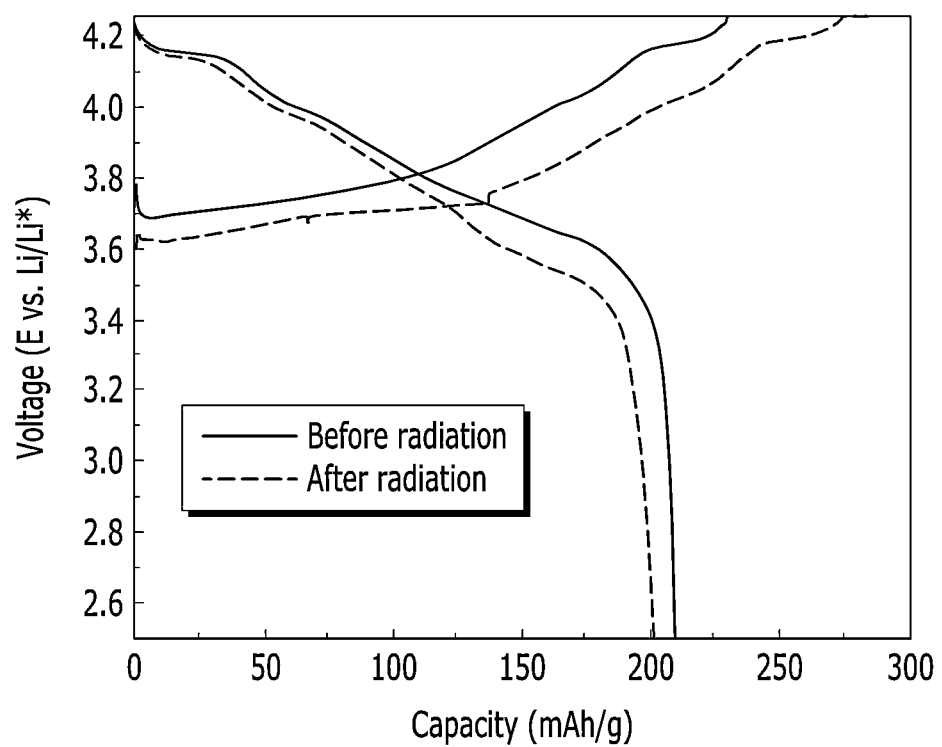
FIG. 5 is a view showing charge and discharge test results before and after irradiation of a secondary battery using an organic-based electrolyte solution.

FIG. 5 shows results before and after irradiation of a secondary battery using an organic-based electrolyte solution.

Referring to FIG. 5, it may be confirmed that the secondary battery using the organic-based electrolyte solution before the irradiation represents a normal charge and discharge curve having a discharge capacity of about 210 mAh/g, and plateaus in 4.2 V and 4 V regions. However, the secondary battery using the organic-based electrolyte solution after the irradiation decreases in discharge capacity to 201.5 mAh/g.

Also, a phenomenon in which the voltage does not rise near 3.6 to 3.7 V during the charging and the voltage is suddenly dropped below 3.7 V during the discharge occurs. Through this, it may be confirmed that the secondary battery after irradiation has side reactions such as a non-faradaic phenomenon independent of intercalation in the battery.

Therefore, it may be inferred that the decomposition of the electrolyte or the surface reaction on the electrode surface acts as a main cause of battery degradation when irradiating the radiation to the secondary battery using the organic-based electrolyte solution.

Experimental Example 2

Figure 6:
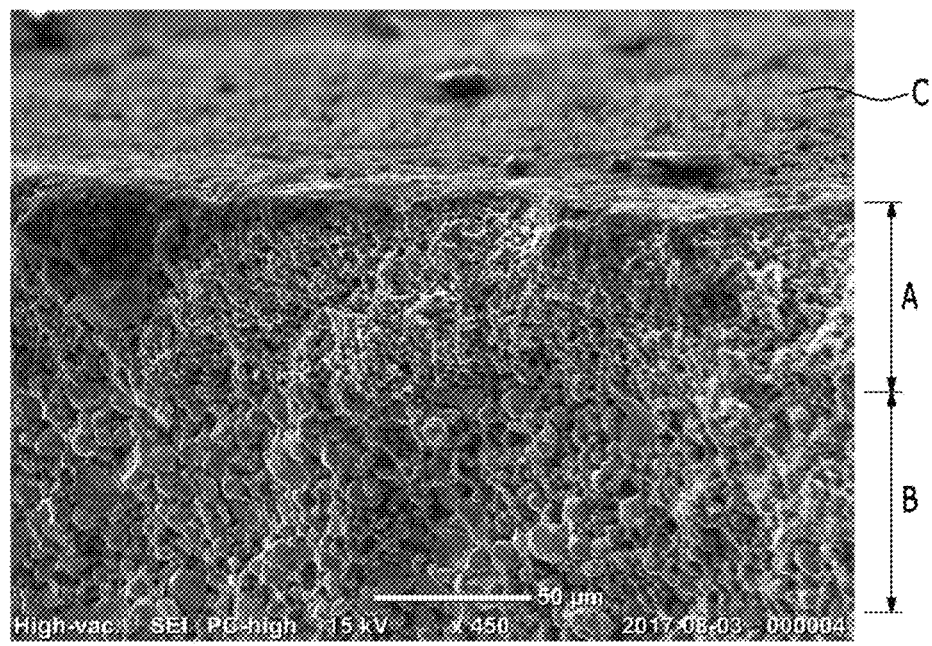
FIG. 6 is a view showing a SEM photograph measuring a cross-section of an electrode supporting member and a positive electrode of a secondary battery manufactured according to Exemplary Embodiment 1.

FIG. 6 shows a SEM photo of a 450× magnification of a cross-section of an electrode supporting member and a positive electrode of a secondary battery manufactured according to Exemplary Embodiment 1.

Referring to FIG. 6, it may be confirmed that the battery supporting member (part B of FIG. 6) layer of the oxide-based solid electrolyte particles (LLZO grain) is very densely formed.

Also, it may be confirmed that the positive active material layer (part A of FIG. 6) is formed with a 50 μm thickness on the battery supporting member and the positive current collector (a part C of FIG. 6) is deposited on the positive active material layer.

In particular, it may be confirmed that the battery supporting member made of the solid electrolyte and the positive active material layer have a densely formed interface without separation or desorption. Accordingly, it may be deduced that lithium ions may move smoothly along the interface.

Experimental Example 3

Figure 7:
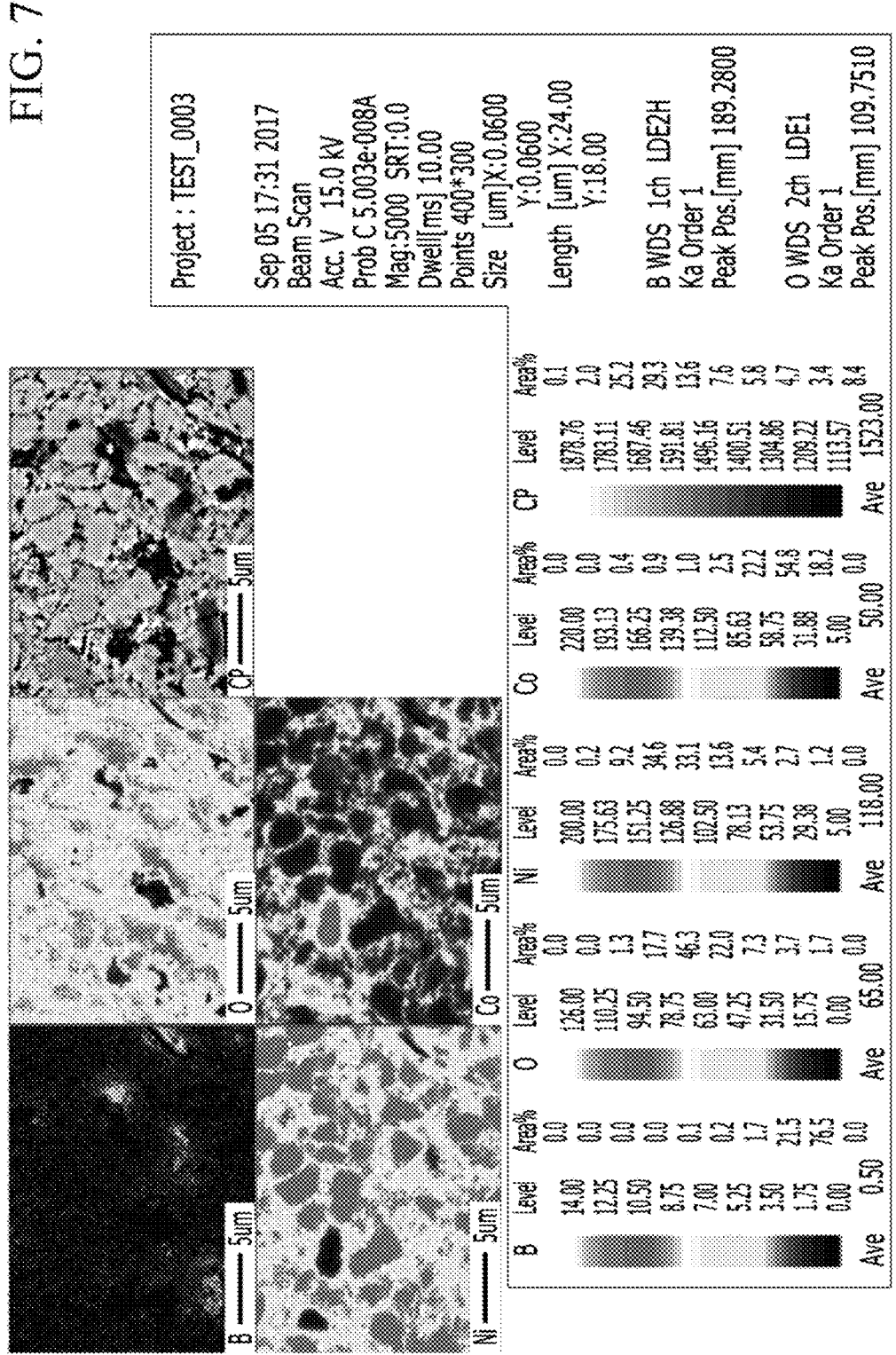
FIG. 7 is a viewing showing a result of mapping each constituent element included in a positive active material layer of a secondary battery manufactured according to Exemplary Embodiment 1.

The positive active material layer of the secondary battery manufactured according to Exemplary Embodiment 1 is processed by using an ion beam cross-section processing device (CP, Cross-section Polisher), each configuration element included in the positive active material layer is mapped by using an electron beam microanalyzer (FE-EPMA (Field Emission Electron Probe Micro-Analyzer), and results are represented in FIG. 7.

In the positive active material layer according to Exemplary Embodiment 1, the positive active material (NCM):the conductive material ($Co_3O_4$):the ion conductor (LBO) has the composition of 73:19:8 (v/v).

Referring to FIG. 7, it may be confirmed that an NCM material used as the positive active material is uniformly distributed in the positive active material layer from a mapping result of Ni.

Also, it may be confirmed that $Co_3O_4$ used as the conductive material is uniformly distributed between the positive active materials from a mapping result of Co.

It may be confirmed that the lithium borate used as the ion conductor is also uniformly distributed between the positive active materials from a mapping result of B.

Experimental Example 4

For the secondary battery manufactured according to Exemplary Embodiments 1 and 2, Reference Examples 1 to 4, and Comparative Example 1, the initial discharge amount is measured in a 4.2 V to 3 V region and the results thereof are shown in Table 1 below.

In detail, in a dry room, for the secondary battery manufactured according to Exemplary Embodiments 1 and 2, Reference Examples 1 to 4, and Comparative Example 1, an external connection terminal made of stainless steel is connected at room temperature and discharge capacity of the battery is measured while applying a constant current of 10 uA by using a charger and discharger (VMP3, bioLogics company).

TABLE 1

| Division | Positive active material layer composition (active material: conductive material:ion conductor) (v/v) | Discharge capacity per unit area (mAh/cm$^2$) |
|---|---|---|
| Exemplary Embodiment 1 | 73:19:8 | 0.41 |
| Exemplary Embodiment 2 | 63:29:8 | 0.43 |
| Reference Example 1 | 83:9:8 | 0.25 |
| Reference Example 2 | 90:2:8 | 0.03 |
| Reference Example 3 | 54:38:8 | 0.12 |
| Reference Example 4 | 45:47:8 | 0.1 |
| Comparative Example 1 | 73:19:8 | 0.26 |

Referring to Table 1, the positive active material of the NCM88 composition is used, and simultaneously the positive active material is included at at least 60 to 80 volume % or more in the positive active material layer, it may be confirmed that the discharge capacity of about 0.41 mAh/cm$^2$ to about 0.43 mAh/cm$^2$ per unit area appears.

However, even if the positive active material of the NCM88 composition is used, in the case of Reference Examples 1 and 2 in which the positive active material in the positive active material layer exceeds 80 volume % and Reference Examples 3 and 4 in which the positive active material is less than 60 volume %, it may be confirmed that the discharge capacity per unit area is significantly deteriorated.

In addition, in the case of Comparative Example 1 using the positive active material of the LCO composition, it may be confirmed that the discharge capacity per unit area is significantly deteriorated compared to the exemplary embodiments.

Experimental Example 5

An open circuit voltage (OCV) is measured to check a self-discharge rate of the secondary battery manufactured according to Exemplary Embodiment 1.

Specifically, for the secondary battery manufactured according to Exemplary Embodiment 1, after initially charging to 4.2 V, and then leaving it at room temperature of 25° C. in the ambient atmosphere, the OCV and the capacity change of the battery are measured for 10 weeks with an interval of one week. The results are shown in FIG. 8.

Figure 8:
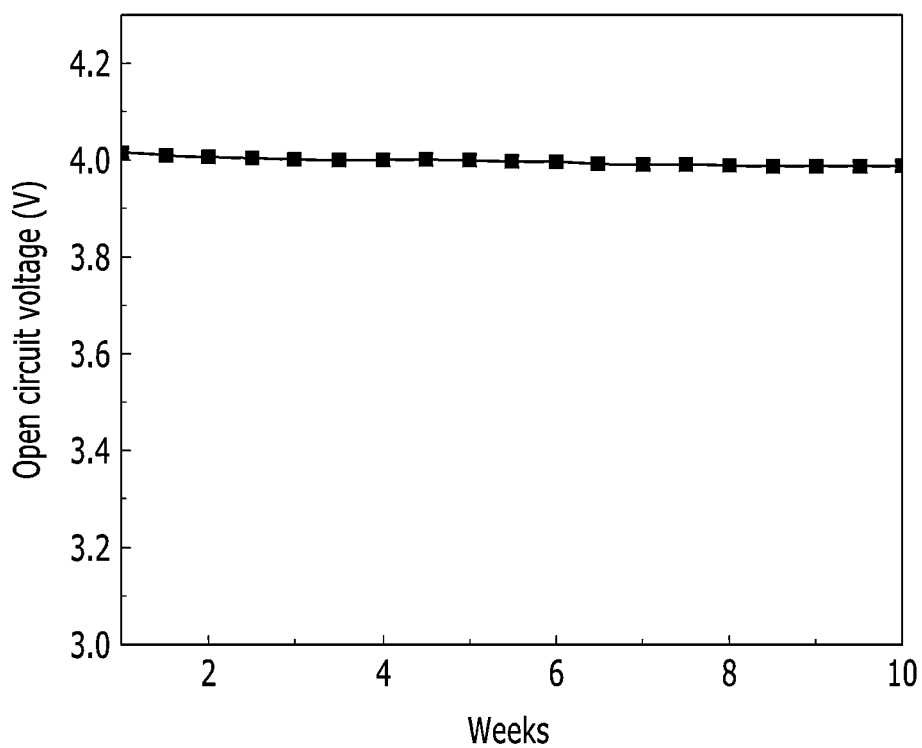
FIG. 8 is a view showing an OCV measuring result for a secondary battery according to Exemplary Embodiment 1.

Referring to FIG. 8, the secondary battery according to Exemplary Embodiment 1 initially exhibits OCV of 4.02 V, which remained almost constant over the course of 10 weeks.

That is, even after 10 weeks, it may be confirmed that the OCV of the secondary battery manufactured according to Exemplary Embodiment 1 is 3.98 V or more and the self-discharge rate characteristic is excellent.

In addition, for the secondary batteries prepared according to Exemplary Embodiments 3 and 4, the initial OCV is measured by the same method as described above, and the discharge capacity per unit area is measured by the same method as in Experimental Example 4. The results are shown in Table 2 below.

TABLE 2

| Division | OCV (V) | Discharge capacity per unit area (mAh/cm$^2$) |
| --- | --- | --- |
| Exemplary Embodiment 3 | 8.03 | 0.39 |
| Exemplary Embodiment 4 | 12.0 | 0.40 |

Referring to Table 2, the secondary battery manufactured according to Exemplary Embodiment 3 exhibits the OCV of 8.03 V and exhibits capacity of about 0.39 mAh/cm$^2$ even when being discharged while applying a constant current of 10 μA to 6 V.

In addition, it may be confirmed that the secondary battery manufactured according to Exemplary Embodiment 4 exhibits the OCV of 12.0 V and discharge capacity of 0.4 mAh/cm$^2$.

Accordingly, it may be confirmed that the unit cell may be usefully applied to devices requiring high voltage when the unit cell composed of the all-solid-state battery according to the present exemplary embodiment is coupled in series.

Experimental Example 6

For the secondary battery manufactured according to Exemplary Embodiments 1 and 2, after irradiating the radiation by the same method as in Experimental Example 1, the OCV and the discharge capacity per unit area are measured by the same method as in Experimental Examples 4 and 5.

Specifically, the β-ray is irradiated with high energy radiation of 6 MeV at 0.5 Hz for 15 pulses for 30 seconds, and then OCV and discharge capacity are measured.

The results are shown in Table 3.

TABLE 3

| Division | OCV (V) | Discharge capacity per unit area (mAh/cm$^2$) |
| --- | --- | --- |
| Exemplary Embodiment 1 | 4.02 | 0.41 |
| Exemplary Embodiment 2 | 4.03 | 0.43 |

Referring to Table 3, it may be confirmed that the secondary batteries manufactured according to Exemplary Embodiments 1 and 2 had little change in the OCV and the discharge capacity per unit area even after irradiation.

Accordingly, in the case of the all-solid-state battery like the exemplary embodiments of the present invention without the organic-based electrolyte solution or the polymer material, since the radiation resistance characteristic is excellent, it may be confirmed that the power is stored without being affected by the high energy irradiation environment.

Experimental Example 7

For the all-solid-state battery manufactured according to Exemplary Embodiment 1, the driving is tested by connecting to an LCD panel with a load of 1 uA. The test process is shown in FIG. 9.

Specifically, the electrode terminals (+) and (−) of the secondary battery are fixed to jigs made of stainless steel by using clamps and then connected to the LCD panel.

At this time, the stainless steel jig is designed to be inserted into the polycarbonate to prevent a short circuit of the battery.

As a test result, the LCD panel connected to the all-solid-state battery according to Exemplary Embodiment 1 is normally operated for about 400 h or more.

Experimental Example 8

For the all-solid-state battery manufactured according to Exemplary Embodiments 5 to 8 in which the unit cells having the capacity of 0.4 mAh/cm$^2$ per unit area are coupled in parallel, the battery capacity is measured. In this case, in the measuring method of the battery capacity, by considering the positive electrode slurry coating area of 0.28 cm$^2$, only the battery capacity is measured before being disposed on the exterior material of Exemplary Embodiment 1 (6), the discharge capacity is measured by applying 10 uA/battery number after connecting the positive electrode part of each unit cell to the positive electrode part and the negative electrode part of each unit cell to the negative electrode part by using a copper wire. The results are shown in Table 4 below.

TABLE 4

| Division | Battery connection number (piece) | Battery capacity (mAh) |
| --- | --- | --- |
| Exemplary Embodiment 5 | 2 | 0.21 |
| Exemplary Embodiment 6 | 3 | 0.29 |

TABLE 4-continued

| Division | Battery connection number (piece) | Battery capacity (mAh) |
| --- | --- | --- |
| Exemplary Embodiment 7 | 5 | 0.52 |
| Exemplary Embodiment 8 | 7 | 0.70 |

Referring to Table 4, it may be confirmed that the low capacity of the unit cell is overcome by inserting the battery coupled in parallel in the battery package.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, it is to be understood that the above-described exemplary embodiments are for illustrative purposes only, and the scope of the present invention is not limited thereto.

DESCRIPTION OF SYMBOLS

1: positive active material
2: ion conductor
3: conductive material
4: positive current collector
5: positive active material layer
11: positive electrode
12: negative electrode
13: battery supporting member
10: all-solid-state battery
30: supporting member
40: controller
50: radioactive isotope battery
51: electrode
60: energy harvesting element
70: sensor
100, 200: secondary battery
111: first exterior material
112: second exterior material
300, 400: monolithic battery module

What is claimed is:

1. An all-solid-state battery comprising:
a battery supporting member including an oxide-based solid electrolyte of a garnet structure;
a positive electrode disposed on a first surface of the battery supporting member; and
a negative electrode disposed on a second surface of the battery supporting member,
wherein the positive electrode includes
a positive active material layer in contact with the first surface of the battery supporting member and including a positive active material represented by Chemical Formula 1 and an ion conductor, and a conductive material, and
a positive current collector disposed on the positive active material layer:

$$Li_{a1}Ni_{b1}Co_{c1}Mn_{d1}M1_{e1}M2_{f1}O_{2-f1}$$ [Chemical Formula 1]

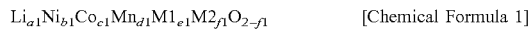

(in Chemical Formula 1,
$0.97 \leq a1 \leq 1.07$, $0.75 \leq b1 \leq 0.95$, $0.03 \leq c1 \leq 0.13$, $0.001 \leq d1 \leq 0.12$, $0 \leq e1 \leq 0.05$, $0 \leq f1 \leq 0.01$, $b1+c1+d1+e1+f1=1$, M1 is one selected from Na, Mg, Al, Si, K, Ca, Sc, Ti, V, B, Cr, Cu, Zn, Ga, Ge, Rb, Sr, Y, Zr, Nb, Mo, Tc, Ru, Rh, Pd, Ag, Cd, In, Sn, Ba, W, and combinations thereof, and
M2 is one selected from N, F, P, S, Cl, Br, I, and combinations thereof), and
wherein
the ion conductor is trilithium borate ($Li_3BO_3$) and is included in a 5 volume % to 15 volume % range with reference to a total volume of the positive active material layer and
the positive active material is included in a 60 volume % to 80 volume % range with reference to the total volume of the positive active material layer, and
the conductive material is included in a 10 volume % to 35 volume % range with reference to the total volume of the positive active material layer.

2. The all-solid-state battery of claim 1, wherein,
in Chemical Formula 1, b1 is $0.8 \leq b1 \leq 0.95$.

3. The all-solid-state battery of claim 1, wherein
an average particle size of the positive active material is 1 μm to 10 μm.

4. The all-solid-state battery of claim 1,
wherein the percentage ratio of the volume of a given material to the total volume of the positive active material layer is assumed to be the volume % of the given material in the positive active material layer, wherein the volume (cm³) of each given material used in the positive active material layer is calculated from the mass (g) and nominal density (g/cm³) of each material, and the sum of the volumes of the materials is used as the total volume of the positive active material layer.

5. The all-solid-state battery of claim 1, wherein
the oxide-based solid electrolyte of the garnet structure is represented by Chemical Formula 2 below:

$$Li_{(7-a2-x)}M3_xLa_3Zr_{2-y-w}Ta_yM4_zM5_wO_{12}$$ [Chemical Formula 2]

(in Chemical Formula 2,
M3 is selected from a group including Al, Na, K, Rb, Cs, Fr, Mg, Ca, and combinations thereof,
M4 is B,
M5 is selected from a group including Nb, Sb, Sn, Hf, Bi, W, Se, Ga, Ge, and combinations thereof,
$0 \leq a2 \leq 0.1$,
$0 \leq x \leq 0.5$,
$0.005 \leq y \leq 0.5$,
$0.1 \leq z \leq 0.5$, and
$0 \leq w < 0.15$).

6. The all-solid-state battery of claim 1,
wherein the percentage ratio of the volume of a given material to the total volume of the positive active material layer is assumed to be the volume % of the given material in the positive active material layer, wherein the volume (cm³) of each given material used in the positive active material layer is calculated from the mass (g) and nominal density (g/cm³) of each material, and the sum of the volumes of the materials is used as the total volume of the positive active material layer.

7. The all-solid-state battery of claim 6, wherein
the conductive material includes one or more conductive materials selected from a group including cobalt oxide ($Co_3O_4$), cerium oxide ($CeO_2$), indium tin oxide (ITO), indium zinc oxide (IZO), lanthanum cobalt oxide ($LaCoO_3$), copper manganese oxide ($Cu_2MnO_4$), and silver (Ag).

8. The all-solid-state battery of claim 1, wherein
the positive current collector includes one material selected from stainless steel (SUS, steel use stainless), gold (Au), platinum (Pt), nickel (Ni), aluminum (Al), molybdenum (Mo), carbon (C), silver (Ag), indium (In), and tin (Sn), or two or more thereof.

9. The all-solid-state battery of claim 1, wherein
the negative electrode includes a lithium metal, an alloy of the lithium metal, lithium titanate ($Li_4Ti_5O_{12}$), or a combination thereof.

10. A manufacturing method of an all-solid-state battery comprising:
forming a positive active material layer by coating a positive active material slurry on a first surface of an electrode supporting member including an oxide-based solid electrolyte of a garnet structure;
forming a positive current collector on the positive active material layer; and
forming a negative electrode on a second surface of the electrode supporting member,
wherein the positive active material slurry includes an ion conductor, and a conductive material, and a positive active material represented by Chemical Formula 1 below:

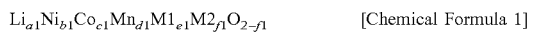
[Chemical Formula 1]

(in Chemical Formula 1,
$0.97 \leq a1 \leq 1.07$, $0.75 \leq b1 \leq 0.95$, $0.03 \leq c1 \leq 0.13$, $0.001 \leq d1 \leq 0.12$, $0 \leq e1 \leq 0.05$, $0 \leq f1 \leq 0.01$, and $b1+c1+d1+e1+f1=1$,
M1 is one selected from Na, Mg, Al, Si, K, Ca, Sc, Ti, V, B, Cr, Cu, Zn, Ga, Ge, Rb, Sr, Y, Zr, Nb, Mo, Tc, Ru, Rh, Pd, Ag, Cd, In, Sn, Ba, W, and combinations thereof, and
M2 is one selected from N, F, P, S, Cl, Br, I, and combinations thereof), and
wherein
the ion conductor is trilithium borate ($Li_3BO_3$) and is included in a 5 volume % to 15 volume % range with reference to a total volume of the positive active material layer and
the positive active material is included in a 60 volume % to 80 volume % range with reference to the total volume of the positive active material layer, and
the conductive material is included in a 10 volume % to 35 volume % range with reference to the total volume of the positive active material layer.

11. The manufacturing method of claim 10, wherein
the oxide-based solid electrolyte of the garnet structure is represented by Chemical Formula 2 below, and the all-solid-state battery is manufactured by including molding the oxide-based solid electrolyte of the garnet structure into the electrode supporting member having a thickness of 60 μm to 1000 μm:

[Chemical Formula 2]

(in Chemical Formula 2,
M3 is selected from a group including Al, Na, K, Rb, Cs, Fr, Mg, Ca, and combinations thereof,
M4 is B,
M5 is selected from a group including Nb, Sb, Sn, Hf, Bi, W, Se, Ga, Ge, and combinations thereof,
$0 \leq a2 \leq 0.1$,
$0 \leq x \leq 0.5$,
$0.005 \leq y \leq 0.5$,
$0.1 \leq z \leq 0.5$, and
$0 \leq w < 0.15$).

12. The manufacturing method of claim 10, wherein
the conductive material includes one or more selected from a group including cobalt oxide ($Co_3O_4$), cerium oxide ($CeO_2$), indium tin oxide (ITO), indium zinc oxide (IZO), lanthanum cobalt oxide ($LaCoO_3$), copper manganese oxide ($Cu_2MnO_4$), and silver (Ag).

13. The manufacturing method of claim 10, wherein
the forming of the negative electrode on the second surface of the electrode supporting member is performed by one of a method of forming the negative electrode of a thin film by vacuum-thermally depositing a negative electrode active material of a lithium metal, an alloy of a lithium metal, lithium titanate ($Li_4Ti_5O_{12}$), or a combination thereof on the second surface of the electrode supporting member, or a method of punching a foil made of the negative electrode active material and applying heat to the second surface of the electrode supporting member to attach the punched foil.

14. A secondary battery comprising:
a unit cell composed of an all-solid-state battery of claim 1;
a first exterior material including an opening at one surface and receiving the unit cell; and
a second exterior material sealing the opening of the first exterior material.

15. The secondary battery of claim 14, wherein
the first exterior material includes at least one material among ceramic, glass, and a metal including an insulation layer at a surface.

16. The secondary battery of claim 14, wherein
the second exterior material includes at least one metal material of Kovar, Invar, stainless steel, copper, and nickel.

* * * * *